(12) United States Patent
Price et al.

(10) Patent No.: US 11,691,353 B2
(45) Date of Patent: Jul. 4, 2023

(54) MULTI-DIE HEAT SEALING SYSTEM AND PROCESS

(71) Applicant: The Procter & Gamble Company, Cincinnati, OH (US)

(72) Inventors: Jonathan L. Price, Cincinnati, OH (US); Pawel M. Siczek, Cincinnati, OH (US); Andre Mellin, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 49 days.

(21) Appl. No.: 17/350,188

(22) Filed: Jun. 17, 2021

(65) Prior Publication Data

US 2022/0402216 A1 Dec. 22, 2022

(51) Int. Cl.
| | |
|---|---|
| *B29C 65/00* | (2006.01) |
| *B65B 51/14* | (2006.01) |
| *B65B 11/12* | (2006.01) |
| *B29C 65/30* | (2006.01) |
| *B65B 51/10* | (2006.01) |

(52) U.S. Cl.
CPC ........ *B29C 66/91421* (2013.01); *B29C 65/30* (2013.01); *B29C 66/849* (2013.01); *B29C 66/91231* (2013.01); *B29C 66/95* (2013.01); *B65B 11/12* (2013.01); *B65B 51/146* (2013.01); *B65B 2051/105* (2013.01)

(58) Field of Classification Search
CPC . B29C 66/91241; B29C 65/30; B29C 66/849; B29C 66/91231; B29C 66/95; B65B 11/12; B65B 51/146; B65B 2051/105
See application file for complete search history.

(56) References Cited

U.S. PATENT DOCUMENTS

| | | | | |
|---|---|---|---|---|
| 4,219,988 | A * | 9/1980 | Shanklin | B29C 66/4322 53/374.6 |
| 2005/0126116 | A1* | 6/2005 | Baldanza | B29C 66/82263 53/547 |
| 2005/0132671 | A1* | 6/2005 | Cinotti | B65B 25/146 53/531 |

* cited by examiner

*Primary Examiner* — George R Koch
(74) *Attorney, Agent, or Firm* — Richard L. Alexander

(57) ABSTRACT

A process is provided for heat sealing substrate layers. The process comprising: conveying an upper die having a heating conductor and a lower die having a heating conductor to a sealing region, where a substrate is applied to one or more items; activating a power supply system; monitoring, via the power supply system, a temperature of the heating conductor of the upper die when in the sealing region; monitoring, via the power supply system, a temperature of the heating conductor of the lower die when in the sealing region, wherein the monitoring of the temperature of the heating conductor of the upper die is performed independently of the monitoring of the temperature of the heating conductor of the lower die; supplying power to the upper die based on the temperature of the heating conductor of the upper die; supplying power to the lower die based on the temperature of the heating conductor of the lower die, wherein the power is supplied to the lower die independently of the power being supplied to the upper die.

27 Claims, 8 Drawing Sheets

MULTI-DIE HEAT SEALING SYSTEM AND PROCESS

FIELD OF THE INVENTION

The present invention relates to a process and apparatus for heat sealing substrate layers.

BACKGROUND OF THE INVENTION

Products made from a fibrous web are used for a variety of purposes and include rolled products such as paper towels and toilet tissues. Multiples of such product can be packaged into a single larger package. One system for forming larger packages of rolled products may comprise an infeed mechanism, such as a conveyor, a film feed assembly, a film forming area, a heat seal/cutting area, and a discharge area. Product to be wrapped is placed on the infeed conveyor, which moves generally horizontally to deliver product to the film forming area. A film is drawn from the film feed assembly into the film forming area, where the film is formed into a tube around the product. Edges of overlapping layers of the film extending in a machine direction are then sealed to create a sealed film tube around the product. The film tube and the product are then delivered to the heat seal/cutting area, where end seals are formed in overlapped film layers and cuts are made to separate adjoining wrapped products into individual packages.

SUMMARY OF THE INVENTION

In accordance with a first aspect of the disclosure, a system is provided for heat sealing substrate layers comprising movable first and second dies capable of engaging substrate layers to create a heat seal between the substrate layers. The first die may have a first heating conductor and the second die may have a second heating conductor. The first and second dies may define a first die set. Movable third and fourth dies may be further provided, which are capable of engaging the substrate layers to create a heat seal between the substrate layers. The third die may have a third heating conductor and the fourth die may have a fourth heating conductor. The third and fourth dies may define a second die set. A conveyor system is coupled to the first, second, third and fourth dies and may be adapted to convey the dies to and from a sealing region. A power supply system may be provided and configured to: separately monitor the temperature of each of the first and second heating conductors when the first die set is engaging the substrate layers and separately monitor the temperature of each of the third and fourth heating conductors when the second die set is engaging the substrate layers; and separately supplying power to the first and second dies when the first die set is engaging the substrate layers based on the separately monitored temperatures of the first and second heating conductors and separately supplying power to the third and fourth dies when the second die set is engaging the substrate layers based on the separately monitored temperatures of the third and fourth heating conductors.

The power supply system may monitor the temperature of each of the first, second, third and fourth heating conductors by monitoring the resistance of each of the first, second, third and fourth heating conductors, wherein the resistance of the heating conductors varies proportionally with temperature.

The power supply system may comprise first and second power supplies. The first power supply may be adapted to monitor the resistance of the first heating conductor when the first die is located in the sealing region and monitor the resistance of the third heating conductor when the third die is located in the sealing region. The first power supply may provide a variable voltage to the first heating conductor when the first die is located in the sealing region to maintain the resistance of the first heating conductor at a first target resistance value corresponding to a first target temperature and may provide a variable voltage to the third heating conductor when the third die is located in the sealing region to maintain the resistance of the third heating conductor at a third target resistance value corresponding to a third target temperature. The second power supply may be adapted to monitor the resistance of the second heating conductor when the second die is located in the sealing region and monitor the resistance of the fourth heating conductor when the fourth die is located in the sealing region. The second power supply may provide a variable voltage to the second heating conductor when the second die is located in the sealing region to maintain the resistance of the second heating conductor at a second target resistance value corresponding to a second target temperature and may provide a variable voltage to the fourth heating conductor when the fourth die is located in the sealing region to maintain the resistance of the fourth die at a fourth target resistance value corresponding to a fourth target temperature.

The power supply system may further comprise: a controller including a processor and memory for storing code executable by the processor. The processor when executing the executable instructions may: cause the first power supply to separately determine the resistance of each of the first and third heating conductors at room temperature; cause the second power supply to separately determine the resistance of each of the second and fourth heating conductors at room temperature; cause the first power supply to determine the first target resistance value based on the resistance of the first heating conductor at room temperature and a temperature coefficient for a material of the first heating conductor; cause the first power supply to determine the third target resistance value based on the resistance of the third heating conductor at room temperature and a temperature coefficient for a material of the third heating conductor; cause the second power supply to determine the second target resistance value based on the resistance of the second heating conductor at room temperature and a temperature coefficient for a material of the second heating conductor; and cause the second power supply to determine the fourth target resistance value based on the resistance of the fourth heating conductor at room temperature and a temperature coefficient for a material of the fourth heating conductor.

The temperature coefficient for the material of the first, second, third and fourth heating conductors may be the same coefficient.

The processor when executing the executable instructions may further: generate a pause command to the first power supply when neither of the first or third dies is located in the sealing region; and generate a pause command to the second power supply when neither of the second or fourth dies is in the sealing region.

The conveyor system may comprise: at least one upper endless belt coupled to the first die and configured to move the first die along a first endless path; at least one lower endless belt coupled to the second die and configured to move the second die along a second endless path, wherein the upper and lower belts cause the first and second dies to come together at the sealing region and separate after they leave the sealing region.

The power supply system may comprise: a first power supply; a second power supply; a fixed bus bar comprising first, second, third and fourth conductors, the first and second conductors being coupled to the first power supply and the third and fourth conductors being coupled to the second power supply; and first, second, third, fourth, fifth, sixth, seventh and eighth brush blocks. The first and second brush blocks may be coupled to and move with the first die, the third and fourth brush blocks may be coupled to and move with the second die, the fifth and sixth brush blocks may be coupled to and move with the third die, and the seventh and eighth brush blocks may be coupled to and move with the fourth die. The first and second brush blocks may only make contact with the first and second conductors as the first die moves along a portion of the first endless path, the third and fourth brush blocks may only make contact with the third and fourth conductors as the second die moves along a portion of the second endless path, the fifth and sixth brush blocks may only make contact with the first and second conductors as the third die moves along a portion of a third endless path, and the seventh and eighth brush blocks may only make contact with the third and fourth conductors as the fourth die moves along a portion of a fourth endless path.

The first power supply may comprise: a first current sensor; a first isolation transformer coupled to the first and second conductors of the fixed bus bar; a first relay coupled to the first transformer; and a first power controller coupled to the first relay and configured to control the actuation of the first relay to control an ON/OFF timing of the first transformer to create a variable voltage for the first and third heating conductors when the first and third heating conductors are in the sealing region so as to maintain the first heating conductor at a first target temperature when the first heating conductor is in the sealing region and to maintain the third heating conductor at a third target temperature when the third heating conductor is in the sealing region.

The second power supply may comprise: a second current sensor; a second isolation transformer coupled to the third and fourth conductors of the fixed bus bar; a second relay coupled to the second transformer; and a second power controller coupled to the second relay and configured to control the actuation of the second relay to control an ON/OFF timing of the second transformer to create a variable voltage for the second and fourth heating conductors when the second and fourth heating conductors are in the sealing region so as to maintain the second heating conductor at a second target temperature when the second heating conductor is in the sealing region and to maintain the fourth heating conductor at a fourth target temperature when the fourth heating conductor is in the sealing region.

In accordance with a second aspect of the present disclosure, a system is provided for heat sealing substrate layers. The system may comprise: a sealing region; upper dies, wherein each upper die includes a heating conductor; lower dies, wherein: each lower die corresponds to one of the upper dies to create corresponding die sets; and each lower die includes a heating conductor; a conveyor system coupled to the upper dies and the lower dies, wherein the conveyor system is configured to convey the die sets to the sealing region such that only one die set is located in the sealing region at a time; and a power supply system. The power supply system may be configured to: monitor a temperature of the heating conductor of the upper die located in the sealing region; monitor a temperature of the heating conductor of the lower die located in the sealing region, wherein the monitoring of the temperature of the heating conductor of the lower die is performed independently of the monitoring of the temperature of the heating conductor of the upper die; supply power to the upper die located in the sealing region based on the temperature of the heating conductor of the upper die; and supply power to the lower die located in the sealing region based on the temperature of the heating conductor of the lower die, wherein the power is supplied to the lower die independently of the power being supplied to the upper die.

The power supply system may monitor the temperature of the heating conductors of the upper and lower dies located in the sealing region by monitoring the resistance of the heating conductors of the upper and lower dies, wherein the resistance of the heating conductors varies proportionally with temperature.

In accordance with a third aspect of the disclosure, a process is provided for heat sealing substrate layers. The process may comprise: conveying an upper die having a heating conductor and a lower die having a heating conductor to a sealing region, where a substrate is applied to one or more items; activating a power supply system; monitoring, via the power supply system, a temperature of the heating conductor of the upper die when in the sealing region; monitoring, via the power supply system, a temperature of the heating conductor of the lower die when in the sealing region, wherein the monitoring of the temperature of the heating conductor of the upper die is performed independently of the monitoring of the temperature of the heating conductor of the lower die; supplying power to the upper die when in the sealing region based on the temperature of the heating conductor of the upper die; supplying power to the lower die when in the sealing region based on the temperature of the heating conductor of the lower die, wherein the power is supplied to the lower die when in the sealing region independently of the power being supplied to the upper die when in the sealing region; and conveying the upper die and the lower die away from the sealing region.

Monitoring the temperature of the heating conductors of the upper and lower dies may comprise monitoring the resistance of the heating conductors of the upper and lower dies, wherein the resistance of the heating conductors varies proportionally with temperature.

DETAILED DESCRIPTION OF THE INVENTION

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

The following term explanations may be useful in understanding the present disclosure:

The term "machine direction" (MD) is used herein to refer to the direction of material flow through a process. In addition, relative placement and movement of material can be described as flowing in the machine direction through a process from upstream in the process to downstream in the process.

The term "cross direction" (CD) is used herein to refer to a direction that is generally perpendicular to the machine direction.

Figure 1:
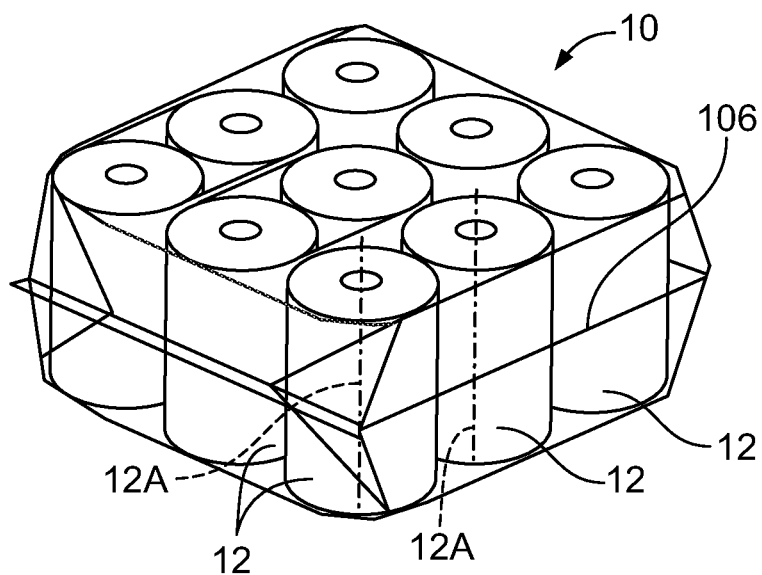
FIG. 1 illustrates a package of absorbent rolled paper products.

In accordance with the present disclosure, packaging apparatuses and methods of packaging discussed herein are adapted to wrap a substrate, such as a sheet of polymeric film or coated paper, about advancing absorbent rolled paper product, such as paper towels and toilet tissues. For example, FIG. 1 illustrates a package or container 10 enclosing individual rolls of paper towels 12. In such a package 10, each individual rolled paper towel product 12 may be enclosed within an individually wrapped package (not illustrated) and then those paper towel products 12 can be packaged into the package 10. In other embodiments, the individual rolls of paper towel product may not be individually wrapped. Each package 10 may contain any number of paper towel products 12 such as nine, as illustrated in FIG. 1, or six, eight, ten, twelve, etc. The rolled paper towel products 12 may be oriented such that their longitudinal axes 12A are perpendicular with a machine direction MD, such as shown FIG. 2. Alternatively, the longitudinal axes 12A may be oriented parallel with the machine direction MD. The package 10 may be formed from a substrate such as a polymeric film material, examples of which include polypropylene and/or polyethylene films, or coated paper. While the package 10 may be formed from either a polymeric film or coated paper, a process and apparatus for manufacturing packages 10 will now be described where the substrate used to form the packages comprises a polymeric film.

Figure 2:
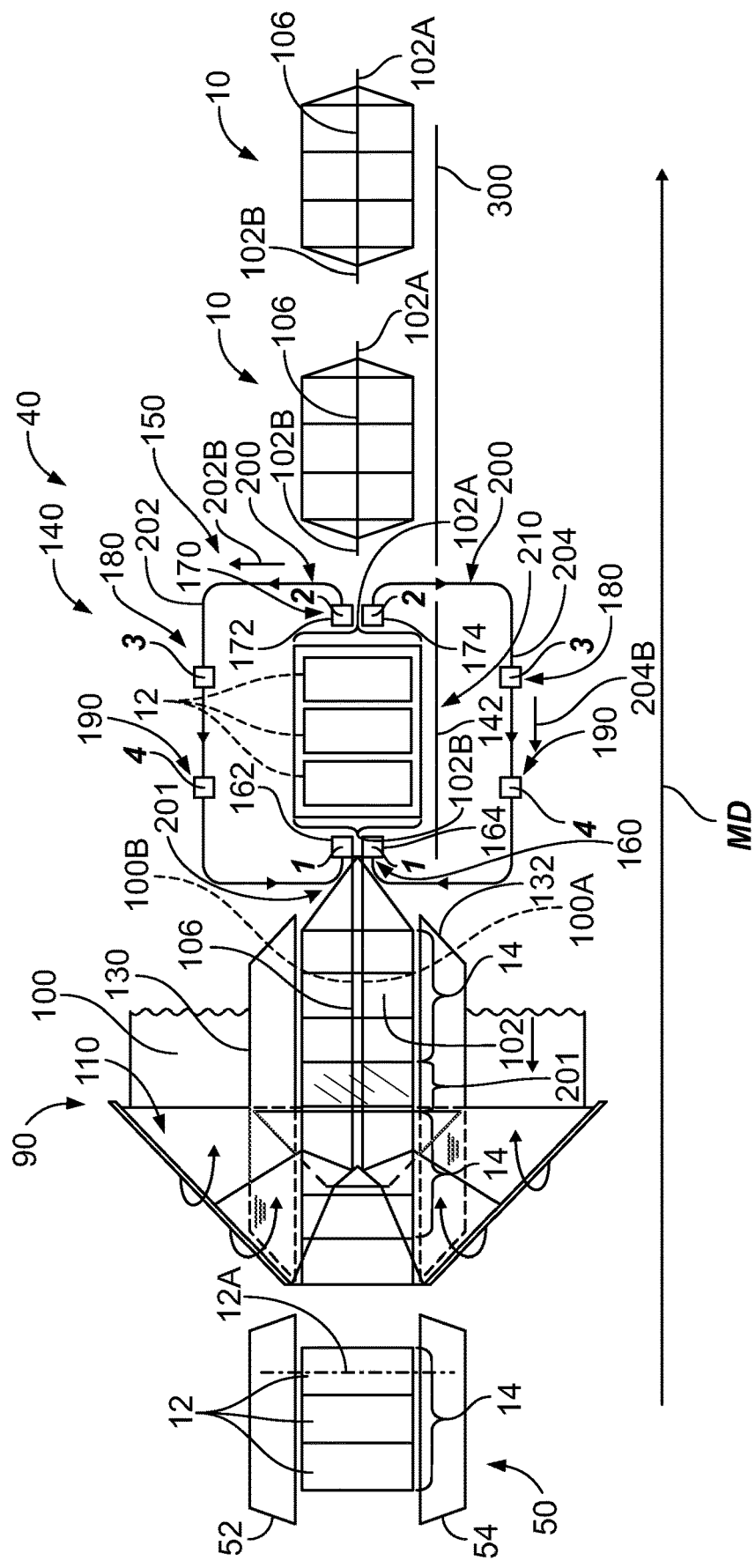
FIG. 2 is a schematic illustration of an apparatus for wrapping a substrate about rolled paper products to form a package of such products.

A package 10, as described above, can be manufactured using a process and apparatus as illustrated in FIG. 2.

An apparatus 40 for wrapping a polymeric film about advancing absorbent rolled products 12 and sealing edges of the polymeric film to create packages 10 is illustrated in FIG. 2. The apparatus 40 comprises a product delivery section 50 defined by upper and lower endless delivery belts 52 and 54, which deliver groups 14 of paper towel products 12 to a film forming area 90 to be enclosed with the polymeric film, see FIG. 2. In the illustrated embodiment, each group 14 of paper towel products 12 may be spaced apart from one another by a predefined distance and may equal a desired number of paper towel products 12 to be contained within each package 10. The groups 14 of paper towel products 12 are serially conveyed by the delivery section 50 to the film forming area 90.

Figure 3:
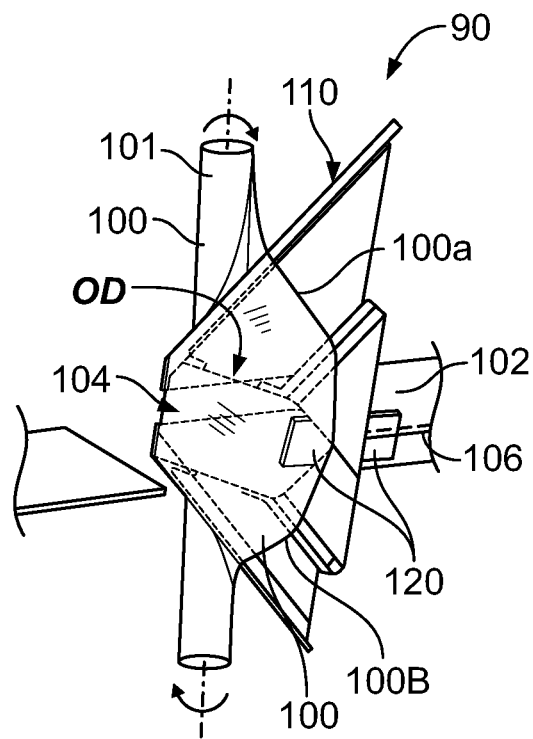
FIG. 3 is a perspective view of a stationary film former of the apparatus of FIG. 2.

In the film forming area 90, a continuous sheet of polymeric film 100 is unrolled from a film roll 101 (shown in FIG. 3 but not in FIG. 2) and advanced onto a stationary former 110. The former 110 is configured to form the continuous sheet of film 100 into a tube 102 with an opening 104. The sheet of film 100 has first and second longitudinal edges 100A and 100B, see FIG. 3. The film 100 is directed onto outer surfaces of the former 110 and may advance in a direction OD opposite to the machine direction MD along the outer surfaces of the former 110. The film 100 then advances around edges of the former 110 and is redirected to advance in the machine direction MD. The former 110 guides the first longitudinal edge 100A and the second longitudinal edge 100B of the film 100 into an overlapping arrangement that in turn, forms the film 100 into the tube 102 that extends in the machine direction MD downstream from the opening 104. The overlapped longitudinal edges 100A and 100B of the film 100 are then sealed or bonded to each other while being held against a sealing member 120 that extends from the opening 104 downstream in the machine direction MD to create an edge seal 106 extending in the machine direction MD.

The groups 14 of paper towel products 12 and the film tube 102 are moved through the film forming area 90 via upper and lower intermediate conveyor belts 130 and 132, see FIG. 2.

Each group 14 of paper towel products 12 located within the film tube 102 are conveyed by the conveyor belts 130 and 132 into a die section 140 where sections 201 of the film tube 102 located between adjacent groups 14 of paper towel products 12 are folded via mechanical folders or air jets striking sides of the film tube 102 to form gusset folds, sealed and cut to form front and rear seals 102A and 102B on each package 10. The die section 140 may comprise a belt conveyor 142, which moves continuously through the die section 140, for conveying the groups 14 of paper towel products 12 and the film tube 102 through the die section 140.

The die section 140 may comprise a system 150 for heat sealing and cutting the sections 201 of the film tube 102 located between adjacent groups 14 of paper towel products 12 so as form the front and rear heat seals 102A and 102B on each package 10, wherein each tube section 201 being cut and heat sealed comprises overlapping layers 201A of the film material 100. Where the gusset folds are located toward lateral outer edges of the film tube 102, there may be four layers of film and in a center section of the film tube 102 inwardly from the gusset folds, there may be two layers of film.

The heat sealing system 150 may comprise a plurality of spaced-apart die sets, wherein first, second, third and fourth die sets 160, 170, 180 and 190 are provided in the embodiment illustrated in FIG. 2. Any number of die sets may be provided. Only the first and second die sets 160 and 170 will be described herein in detail as the third and fourth die sets 180 and 190 may be constructed and operated in a similar manner to the first and second die sets 160 and 170.

Figure 4:
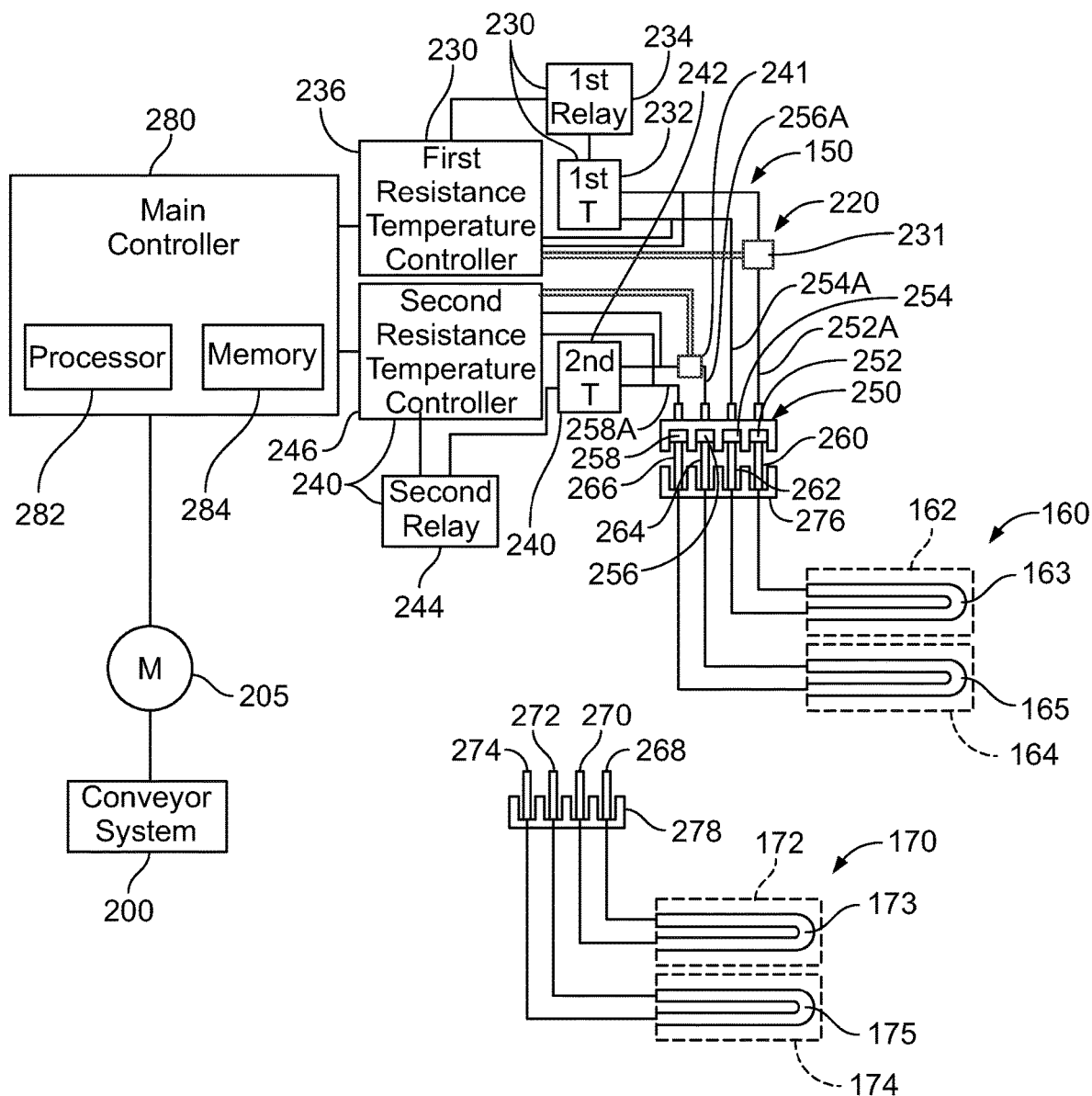
FIG. 4 is a schematic illustration of a heat sealing system of the apparatus of FIG. 2.
Figure 8:
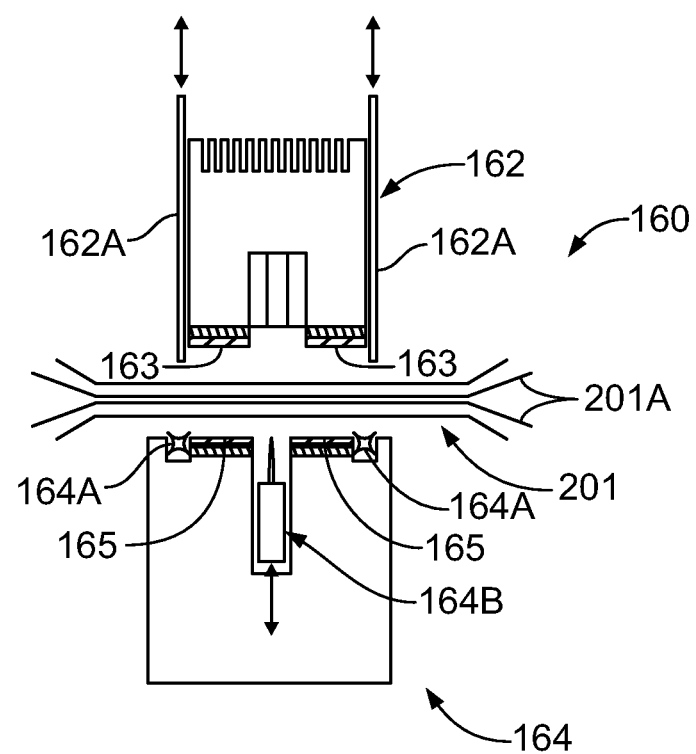
FIG. 8 illustrates a first die set of the apparatus of FIG. 2.

The first die set 160 may comprise movable first and second dies 162 and 164 capable of engaging polymeric film layers 201A of a first group of tube sections 201 (e.g., a first one out of every four tube sections 201 passing through the die section 140) to create one or more heat seals between the film layers 201A of each tube section 201 of the first group, see FIGS. 2, 4 and 8. The first die 162 may comprise a first heating conductor 163 and the second die 164 may comprise a second heating conductor 165, see FIGS. 4 and 8. The first die 162 may further comprise reciprocating clamping members 162A for engaging and clamping the film layers 201A of the tube section 201 against gripper anvils 164A located on the second die 164. The second die 164 further includes a reciprocating knife 164 for cutting the film layers 201A of the tube section 201 between adjacent heat seals, defined by a front heat seal 102A of one package 10 and a rear heat seal 102B of an adjacent, different package 10. The second die set 170 may comprise third and fourth dies 172 and 174 capable of engaging the polymeric film layers of a second group of the tube sections 201 (e.g., a second one out of every four tube sections 201 passing through the die section 140) to create one or more heat seals between the film layers 201A. The third die 172 may have a third heating conductor 173 and the fourth die 174 may have a fourth heating conductor 175, see FIG. 4. The third die 172 may also comprise reciprocating clamping members (not shown) and the fourth die 174 may comprise gripper anvils and a reciprocating knife (not shown).

The heat sealing system 150 may further comprise a conveyor system 200 coupled to the first, second, third and fourth die sets 160, 170, 180 and 190 for conveying the die sets 160, 170, 180 and 190 to a sealing region 210 within the die section 140, see FIG. 2. Only one die set 160, 170, 180 and 190 is located in the sealing region 210 at any given time. Within the sealing region 210, the die sets 160, 170, 180 and 190 serially engage and move with the continuously moving tube sections 201 located between the adjacent groups 14 of paper towel products 12 to seal and cut those tube sections 201 to form the front and rear seals 102A and 102B on each package 10 and separate the packages 10 from one another. Only one of the die sets 160, 170, 180 and 190 is engage with a given tube section 201 at any given time in the sealing region 210. That one die set moves with the given tube section 201 as the tube section 201 moves continuously through the sealing region 210 and first cuts and then creates front and rear heat seals 102A and 102B on the given tube section 201 as the tube section 201 and the one die set continuously move through the sealing region 210. The dies of that one die set may continue to engage with the given tube section 201 for a short time period after the die set exits the sealing region 210 and eventually the dies of that die set separate from one another. In FIG. 2, the first and second dies 162 and 164 of the first die set 160 are about to come together and engage one tube section 201 while the third and fourth dies 172 and 174 of the second die set 170 are separating from one another after sealing and severing another tube section 201.

Figure 2A:
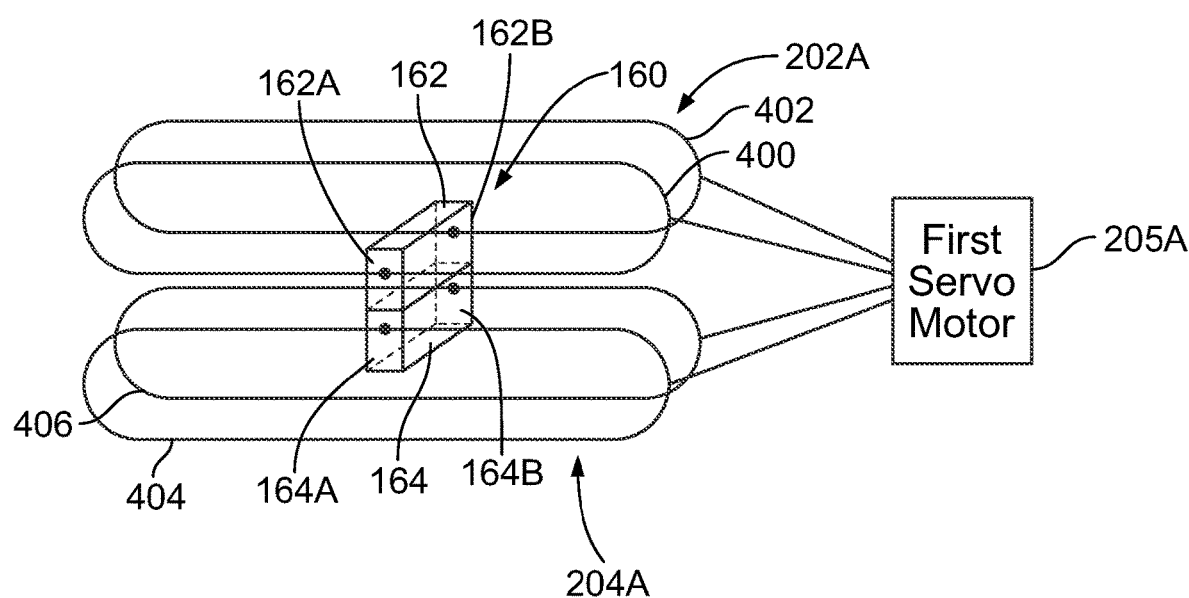
FIG. 2A is a schematic illustration of a first upper pair of belts coupled to a first die and a first lower pair of belts coupled to a second die.

The first, second, third and fourth dies 162, 164, 172 and 174 and the dies of the third and fourth die sets 180 and 190 extend across the film tube 102 in the cross direction. Each die has opposing first and second ends. As illustrated in FIG. 2A, the first die 162 has first and second ends 162A and 162B and the second die 164 has first and second ends 164A and 164B.

The conveyor system 200 may comprise first, second, third and fourth upper pairs 202 of laterally spaced apart first and second endless belts coupled to the opposing ends of each of the first and third dies 162 and 172 and corresponding dies of the third and fourth die sets 180 and 190. The upper pairs of first and second endless belts may move in the direction indicated by arrow 202B, see FIG. 2. The conveyor system 200 may further comprise first, second, third and fourth lower pairs 204 of laterally spaced apart first and second endless belts coupled to the opposing ends of each of the second and fourth dies 164 and 174 and corresponding dies of the third and fourth die sets 180 and 190. The lower pairs of first and second endless belts may move in the direction indicated by arrow 204B, see FIG. 2. As illustrated in FIG. 2A, an upper first endless belt 400 is coupled to the first end 162A of the first die 162 and an upper second endless belt 402 is coupled to the second end 162B of the first die 162. The first and second endless belts 400 and 402 define the first upper pair 202A of belts coupled to the opposing ends 162A and 162B of the first die 162. As also illustrated in FIG. 2A, a lower first endless belt 404 is coupled to the first end 164A of the second die 164 and a lower second endless belt 406 is coupled to the second end 162B of the second die 164. The first and second endless belts 404 and 406 define the first lower pair 204A of belts coupled to the opposing ends 164A and 164B of the second die 164.

Each die comprises opposing cam followers (not shown) at its opposing ends engaged in corresponding cam tracks (not shown) defining an endless path of movement for each die, a portion of which extends along the sealing region 210. The corresponding pair of endless belts coupled to each die cause the die to move along its endless path defined by its corresponding cam tracks and the corresponding pair of endless belts also cause the die to move through the sealing region 210.

The conveyor system 200 may further comprise a servo motor system 205 comprising first, second, third and fourth servo motors, see FIG. 4, for driving the upper and lower pairs of belts. More specifically, the first upper pair of belts 202A and the first lower pair of belts 204A for moving the first die set 160 are driven by the first servo motor 205A, see FIG. 2A. The second upper pair of belts and the second lower pair of belts for moving the second die set 170 are driven by the second servo motor. The third upper pair of belts and the third lower pair of belts for moving the third die set 180 are driven by the third servo motor and the fourth upper pair of belts and fourth lower pairs of belts for moving the fourth die set 190 are driven by the fourth servo motor.

The heat sealing system 150 may also comprise a power supply system 220 for supplying power to the first, second, third and fourth die sets 160, 170, 180 and 190, see FIG. 4. The power supply system 220 will only be described herein for supply power to the first and second die sets 160 and 170 as the power supply system 220 provides power to the third and fourth die sets 180 and 190 in a similar manner.

The power supply system 220 is configured to separately monitor the temperature of each of the first and second heating conductors 163 and 165 when the first die set 160 is engaging the film layers in the sealing region 210 and separately monitor the temperature of each of the third and fourth heating conductors 173 and 175 when the second die set 170 is engaging the film layers in the sealing region 210. The power supply system 220 is also configured to separately supply power to the first and second dies 162 and 164 when the first die set 160 is engaging the film layers in the sealing region 210 based on the separately monitored temperatures (such as via monitored resistances as discussed further below) of the first and second heating conductors 163 and 165 and separately supply power to the third and fourth dies 172 and 174 when the second die set 170 is engaging the film layers in the sealing region 210 based on the separately monitored temperatures (such as via monitored resistances as discussed further below) of the third and fourth heating conductors 173 and 175.

In the illustrated embodiment, the power supply system 220 monitors the temperature of each of the first, second, third and fourth heating conductors 163, 165, 173 and 175 by monitoring the resistance of each of the first, second, third and fourth heating conductors 163, 165, 173 and 175, wherein the resistance of each heating conductor varies proportionally with temperature.

In accordance with one implementation of the present disclosure, the power supply system 220 comprises first and second power supplies 230 and 240, respectively, see FIG. 4. The first power supply 230 is adapted to monitor the resistance of the first heating conductor 163 when the first die 162 is located in the sealing region 210 and monitor the resistance of the third heating conductor 173 when the third die 172 is located in the sealing region 210. The first power supply 230 provides a variable voltage to the first heating conductor 163 when the first die 162 is located in the sealing region 210 to maintain the resistance of the first heating conductor 163 at a first target resistance value corresponding to a first target temperature and provides a variable voltage to the third heating conductor 173 when the third die 172 is located in the sealing region 210 to maintain the resistance of the third heating conductor 173 at a third target resistance value corresponding to a third target temperature.

The second power supply 240 is adapted to monitor the resistance of the second heating conductor 165 when the second die 164 is located in the sealing region 210 and monitor the resistance of the fourth heating conductor 175 when the fourth die 174 is located in the sealing region 210. The second power supply 240 provides a variable voltage to the second heating conductor 165 when the second die 164 is located in the sealing region 210 to maintain the resistance of the second heating conductor 165 at a second target resistance value corresponding to a second target temperature and provides a variable voltage to the fourth heating conductor 175 when the fourth die 174 is located in the sealing region 210 to maintain the resistance of the fourth die 174 at a fourth target resistance value corresponding to a fourth target temperature.

Figure 5:
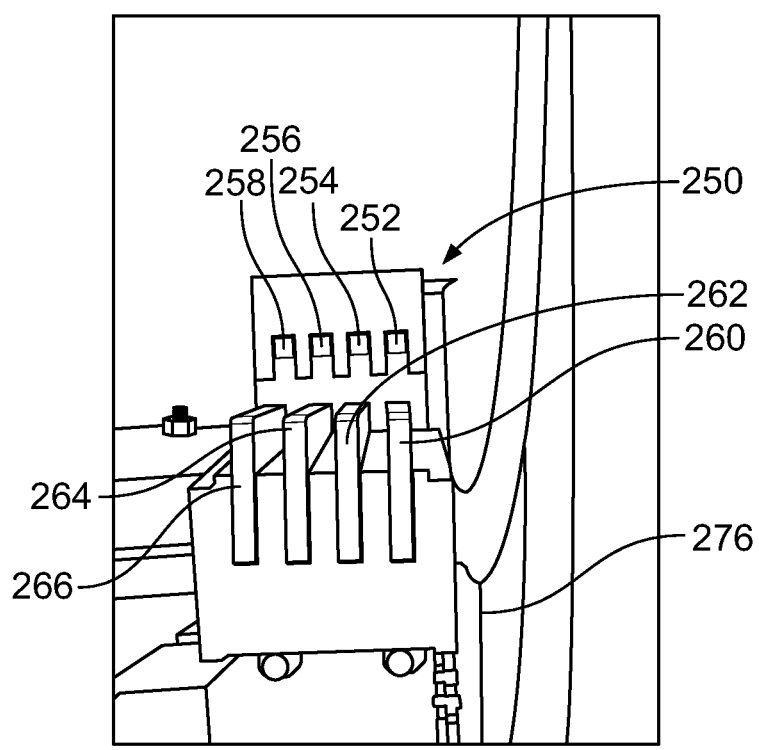
FIG. 5 is a perspective view of a fixed bus bar of the power supply system of the apparatus of FIG. 2.

The power supply system 220 further comprises a fixed bus bar 250 comprising first, second, third and fourth conductors 252, 254, 256 and 258, see FIGS. 4 and 5. The first and second conductors 252 and 254 may be coupled to the first power supply 230 via further conductors 252A and 254A and the third and fourth conductors 256 and 258 may be coupled to the second power supply 240 via further conductors 256A and 258A. The fixed bus bar 250 extends along substantially the entire length of the sealing region 210.

The power supply system 220 still further comprises first, second, third, fourth, fifth, sixth, seventh and eighth spring-biased brush blocks 260, 262, 264, 266, 268, 270, 272, 274, wherein the first, second, third and fourth brush blocks 260, 262, 264 and 266 are coupled to a first movable base 276, which base 276 is coupled to and moves through the sealing region 210 with the first and second dies 162 and 164. The first base 276 moves adjacent to the bus bar 250, see FIG. 4, as the base 276 moves through the sealing region 210. The fifth, sixth, seventh and eighth brush blocks 268, 270, 272 and 274 are coupled to a second movable base 278, which base 278 is coupled to and moves through the sealing region 210 with the third and fourth dies 172 and 174, see FIGS. 4 and 5. The second base 278 moves adjacent to the bus bar 250 as the base 278 moves through the sealing region 210. Four additional spring-biased brush blocks (not shown) are coupled to a third movable base (not shown), which third base is coupled to and moves through the sealing region 210 with the third die set 180 and four additional spring-biased brush blocks (not shown) are coupled to a fourth movable base (not shown), which fourth base is coupled to and moves through the sealing region 210 with the fourth die set 190.

The first and second brush blocks 260 and 262 only make contact with the first and second conductors 252 and 254 of the fixed bus bar 250 as the first die 162 moves along a portion of its endless path extending through the sealing region 210. The third and fourth brush blocks 264 and 266 only make contact with the third and fourth conductors 256 and 258 of the fixed bus bar 250 as the second die 164 moves along a portion of its endless path extending through the sealing region 210. The fifth and sixth brush blocks 268 and 270 only make contact with the first and second conductors 252 and 254 of the fixed bus bar 250 as the third die 172 moves along the portion of its endless path extending through the sealing region 210, and the seventh and eighth brush blocks 272 and 274 only make contact with the third and fourth conductors 256 and 258 of the fixed bus bar 250 as the fourth die 174 moves along a portion of its endless path extending through the sealing region 210. Only one base and one die set is positioned in the sealing region 210 at any given time.

The first power supply 230 may comprise a first current sensor 231, such as a current transformer, a first isolation transformer 232 coupled to the first and second conductors 252 and 254 of the fixed bus bar 250 via the further conductors 252A and 254A; a first relay 234 coupled to the first transformer 232; and a first power controller 236 coupled to the first current sensor 231, the first relay 234 and to the further conductors 252A and 254A. The first power controller 236 is configured to control the actuation of the first relay 234 to control an ON/OFF timing of the first transformer 232 to create a variable voltage for the first or the third heating conductor 163 and 173 when either the first heating conductor 163 or the third heating conductor 173 is in the sealing region 210 so as to maintain the first heating conductor 163 at the first target temperature when the first heating conductor 163 is in the sealing region 210 and to maintain the third heating conductor 173 at the third target temperature when the third heating conductor 173 is in the sealing region 210. The first power controller 236 may comprise a resistance temperature controller which is commercially available from Toss Gmbh & Co. under the product designation "PIREG-C2."

The first power controller 236 determines the first target resistance for the first heating conductor 163 during a calibration procedure involving the first heating conductor 163 and determines the third target resistance for the third heating conductor 173 during a separate calibration procedure involving the third heating conductor 173. Since the resistance of each of the heating conductors varies proportionally with temperature, the first power supply 230 is able to maintain the first heating conductor 163 at the first target temperature by maintaining the resistance of the first heating conductor 163 at the first target resistance by supplying a variable voltage to the first heating conductor 163. The first power supply 230 is also able to maintain the third heating conductor 173 at the third target temperature by maintaining the resistance of the third heating conductor 173 at the third target resistance by supplying a variable voltage to the third heating conductor 173.

The first power controller 236 may determine a room temperature resistance $R_{RT163}$ and $R_{RT173}$ for each of the first and the third heating conductors 163 and 173 separately during a calibration procedure when the first and third heating conductors 163 and 173 are at room temperature, e.g., 20 degrees C. The first power controller 236 receives current signals from the first current sensor 231 indicative of the current passing through either the first or the third heating conductor 163 and 173, separately measures the voltage across each heating conductor 163 and 173 during the calibration procedure and determines the corresponding room temperature resistance $R_{RT163}$ and $R_{RT173}$ of each heating conductor 163 and 173 using Ohm's law (R=V/I). During a heat sealing operation, it may be desirable to maintain the first and third heating conductors 163 and 173 at a temperature of about 135 degrees C. Hence, the first power controller 236 may separately determine the first target resistance $R_{TAR163}$ for the first heating conductor 163 and the third target resistance $R_{TAR173}$ for the third heating conductor 173 using the equation: $R_{TAR}$ (Target Resistance at 135 degrees C.)=$R_{RT}$ (Room Temperature Resistance)+ (135−20)*Tc, where "Tc" equals a temperature coefficient for the material from which the first and third heating conductors 163 and 173 are made. One example of Tc=7.46× 10-4 1/K for Alloy A 20, which is commercially available from Toss Gmbh & Co.

The second power supply 240 may comprise a second current sensor 241, a second isolation transformer 242 coupled to the third and fourth conductors 256 and 258 of the fixed bus bar 250 via the further conductors 256A and 258A; a second relay 244 coupled to the second transformer 242; and a second power controller 246 coupled to the second current sensor 241, the second relay 244 and to the further conductors 256A and 258A. The second power controller 246 is configured to control the actuation of the second relay 244 to control an ON/OFF timing of the second transformer 242 to create a variable voltage for the second or the fourth heating conductor 165 and 175 when either the second heating conductor 165 or the fourth heating conductor 175 is in the sealing region 210 so as to maintain the second heating conductor 165 at a second target temperature when the second heating conductor 165 is in the sealing region 210 and to maintain the fourth heating conductor 175 at a fourth target temperature when the fourth heating conductor 175 is in the sealing region 210. The second power controller 246 may also comprise the resistance temperature controller which is commercially available from Toss Gmbh & Co. under the product designation "PIREG-C2."

The second power controller 246 determines the second target resistance for the second heating conductor 165 during a calibration procedure involving the second heating conductor 165 and determines the fourth target resistance for the fourth heating conductor 175 during a separate calibration procedure involving the fourth heating conductor 175. Since the resistance of each of the heating conductors varies proportionally with temperature, the second power supply 240 is able to maintain the second heating conductor 165 at the second target temperature by maintaining the resistance of the second heating conductor 165 at the second target resistance by supplying a variable voltage to the second heating conductor 165 and maintain the fourth heating conductor 175 at the fourth target temperature by maintaining the resistance of the fourth heating conductor 175 at the fourth target resistance by supplying a variable voltage to the fourth heating conductor 175.

The second power controller 246 may determine a room temperature resistance $R_{RT165}$ and $R_{RT175}$ for each of the second and the fourth heating conductors 165 and 175 separately during a calibration procedure when the second and fourth heating conductors 165 and 175 are at room temperature, e.g., 20 degrees C. The second power controller 246 receives current signals from the second current sensor 241 indicative of the current passing through either the second or the fourth heating conductor 165 and 175, measures the voltage across each heating conductor 165 and 175 during the calibration procedure and determines the corresponding room temperature resistance $R_{RT165}$ and $R_{RT175}$ of each heating conductor 165 and 175 using Ohm's law (R=V/I). During a heat sealing operation, it may be desirable to maintain the second and fourth heating conductors 165 and 175 at a temperature of about 135 degrees C. Hence, the second power controller 246 may separately determine the second target resistance $R_{TAR165}$ for the second heating conductor 165 and the fourth target resistance $R_{TAR175}$ for the fourth heating conductor 175 using the equation: $R_{TAR}$=$R_{RT}$+(135−20)*Tc, where "Tc" equals a temperature coefficient for the material from which the second and fourth heating conductors 165 and 175 are made.

By providing separate first and second power supplies 230 and 240, when the first die set 160 is located in the sealing region 210, the temperature of each of the first and second heating conductors 163 and 165 can be separately controlled. Similarly, when the second die set 170 is located in the sealing region 210, the temperature of each of the third and fourth heating conductors 173 and 175 can be separately controlled. This is advantageous as all parasitic losses in each separate heating conductor and corresponding conductors, base, transformer and relay are taken into account when the heating conductor's room temperature resistance is determined. Further, the resistances of the first and second heating conductors 163 and 165 may vary due to variations in material used for and the length of the heating conductors 163 and 165. Likewise, the resistances of the third and fourth heating conductors 173 and 175 may vary due to variations in material used for and the length of the heating conductors 173 and 175. Hence, temperature variability in the first and second heating conductors 163 and 165 and similarly in the third and fourth heating conductors 173 and 175 resulting from mismatches in resistances between the first and second heating conductors 163 and 165 and also between the third and fourth heating conductors 173 and 175 is substantially reduced. Improved heat seals are made when the first and second heating conductors 163 and 165, when in the sealing region 210, are separately monitored and maintained at a desired temperature as well as when the third and fourth heating conductors 173 and 175, when in the sealing region 210, are separately monitored and maintained at a desired temperature. It is also noted that by separately monitoring the temperatures of the first and second heating conductors 163 and 165 and also separately monitoring the temperatures of the third and fourth heating conductors 173 and 175, diagnosing problems in the heating conductors and the corresponding first and second power supplies 230 and 240 is made easier.

The power supply system 220 may also comprise a main controller 280 including a processor 282 and a memory component 284 for storing code executable by the processor 282. The processor 282 may comprise any processing component operable to receive and execute instructions (such as from the memory component 284). The processor 282 may comprise any kind of a device which receives input data, processes that data through computer instructions, and generates output data. Such a processor can be a programmable logic controller (PLC), microcontroller, laptop or notebook computer, desktop computer, microcomputer, digital signal processor (DSP), mainframe, server, other programmable computer devices, or any combination thereof. Such a processor can also be implemented using programmable logic devices such as field programmable gate arrays (FPGAs) or, alternatively, realized as application specific integrated circuits (ASICs) or similar devices. The term "processor" or "controller" is also intended to encompass a combination of two or more of the above recited devices, e.g., two or more microcontrollers.

The memory component 284 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Additionally, the memory component 284 may store software, code, instructions or applications that can be executed by the processor 282.

Figure 6:
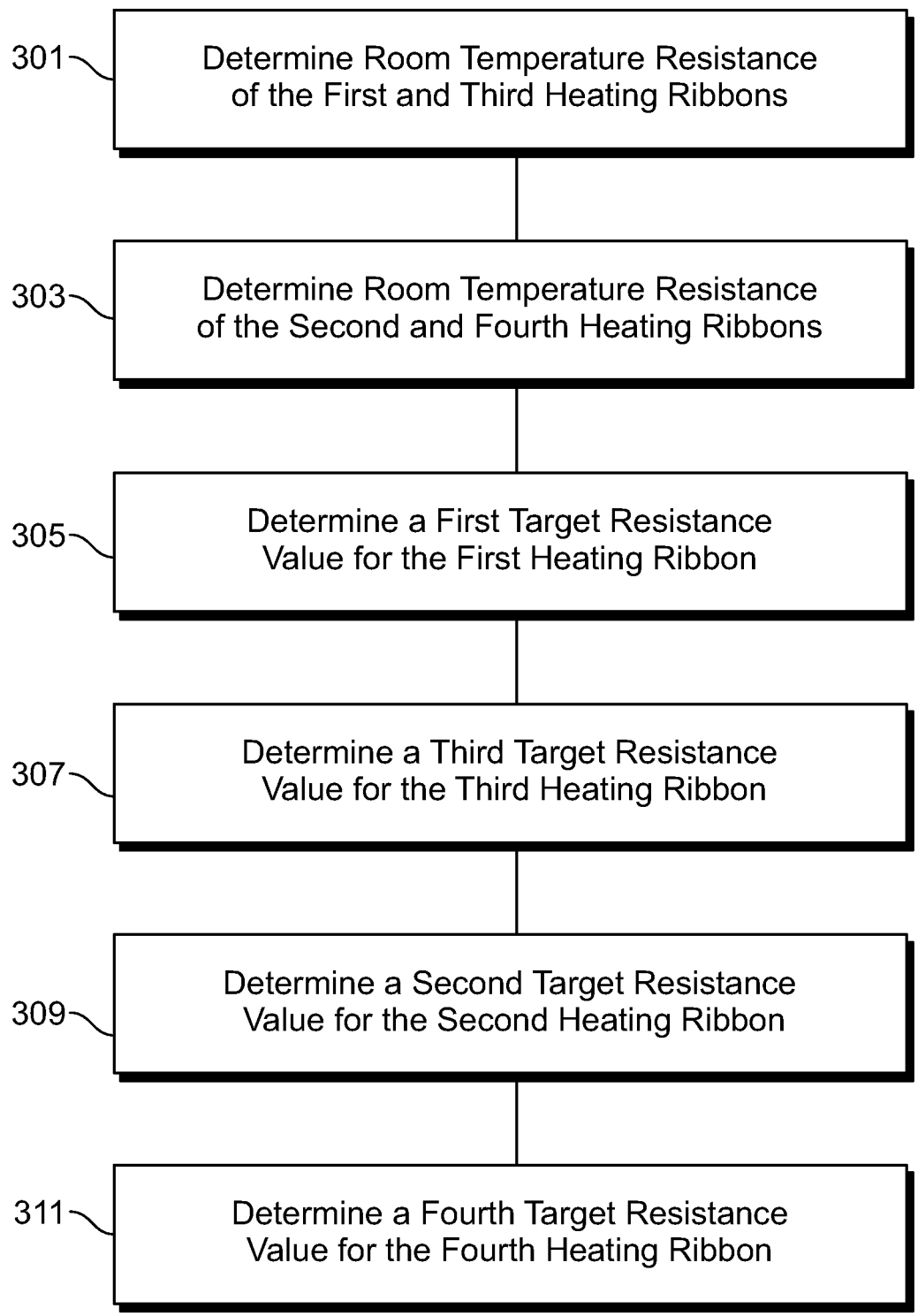
FIG. 6 illustrates steps performed by a processor of a main controller of the power supply system during a calibration mode.

During a calibration mode, the processor 282, when executing the executable instructions, may effect the following steps, as set out in the flowchart of FIG. 6. In step 301, the processor 282 may send an instruction message to the first power controller 236 via an Ethernet connection to separately determine the resistance of each of the first and third heating conductors 163 and 173 at room temperature using Ohm's law as discussed above. In step 303, the processor 282 may send an instruction message to the second power controller 246 via an Ethernet connection to separately determine the resistance of each of the second and fourth heating conductors 165 and 175 at room temperature. In step 305, the processor 282 may send an instruction message to the first power controller 236 via an Ethernet connection to determine the first target resistance value based on the resistance of the first heating conductor 163 at room temperature and a temperature coefficient for a material of the first heating conductor 163, see the equation set out above. In step 307, the processor 282 may cause the first power controller 236 to determine the third target resistance value based on the resistance of the third heating conductor 173 at room temperature and a temperature coefficient for a material of the third heating conductor 173. In step 309, the processor 282 may cause the second power controller 246 to determine the second target resistance value based on the resistance of the second heating conductor 165 at room temperature and a temperature coefficient for a material of the second heating conductor 165. In step 311, the processor 282 may cause the second power controller 246 to determine the fourth target resistance value based on the resistance of the fourth heating conductor 175 at room temperature and a temperature coefficient for a material of the fourth heating conductor 175.

The temperature coefficient for the material of the first, second, third and fourth heating conductors 163, 165, 173 and 175 may be the same coefficient.

Figure 7:
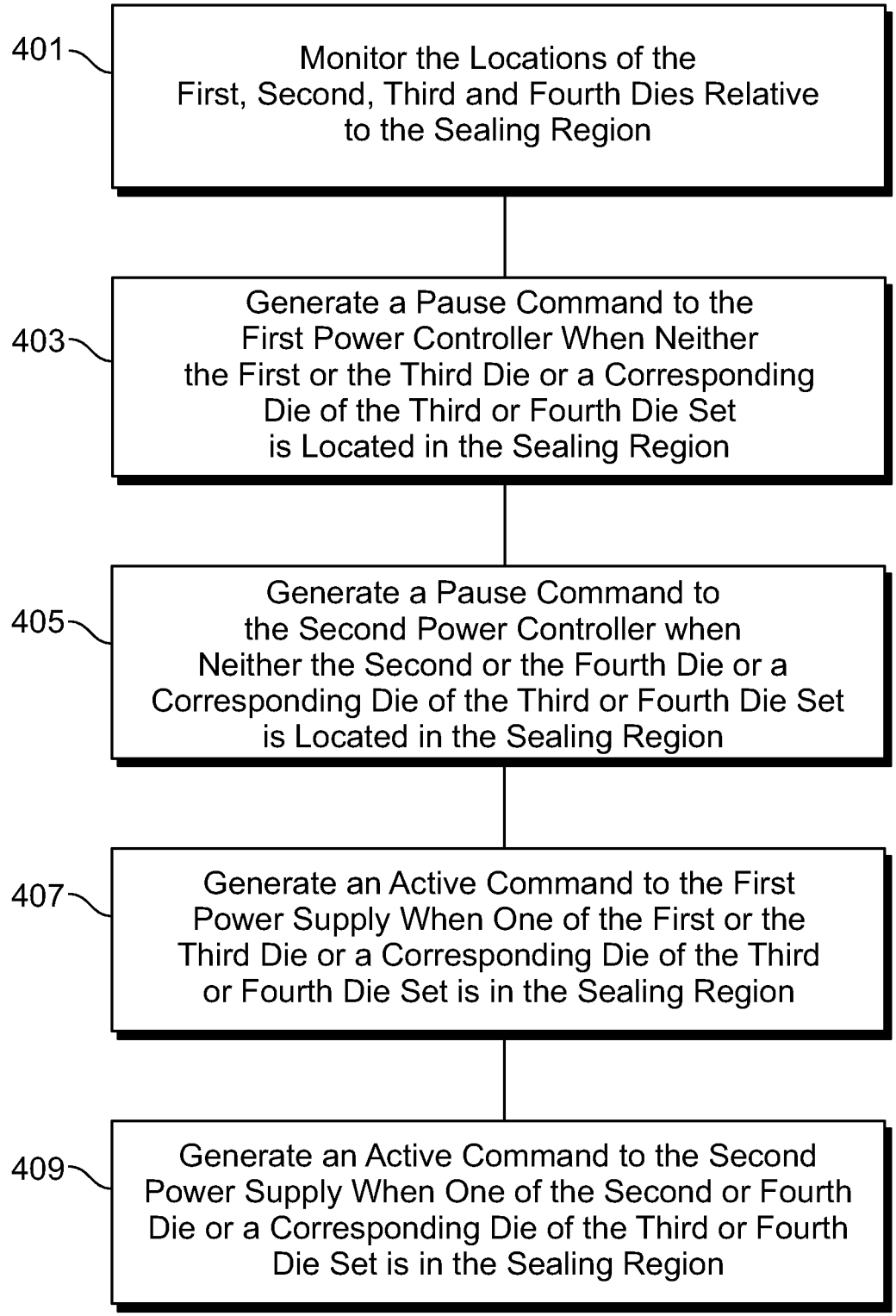
FIG. 7 illustrates steps performed by the processor of the main controller of the power supply system during a heat sealing mode.

During a heat sealing mode, the processor 282, when executing the executable instructions, may effect the following steps, as set out in the flowchart of FIG. 7.

The processor 282, in step 401, monitors the locations of the first, second, third and fourth dies 162, 164, 172 and 174 relative to the sealing region 210. As noted above, the first and second servo motors are coupled to and drive the first and second upper pairs of belts and the first and second lower pairs of belts for continuously moving the first and second die sets 160 and 170 along their endless paths and through the sealing region 210. Each servo motor comprises an encoder. A flag (not shown) may be provided on at least one belt coupled to each die. The processor 282 knows the distance from the flag to the corresponding die coupled to that belt. A fixed home sensor (not shown) may be provided for each belt provided with a flag. Based on the home sensor sensing the flag as the belt completes each rotation along its endless path and using counts from the encoder of the corresponding servo motor, the processor 282 is able to determine the location of each die relative to the beginning and end points of the sealing region 210. Hence, the processor 282 knows the locations of all dies relative to the sealing region 210 including whether none of the dies are located in the sealing region 210.

When neither of the first or the third die 162 or 172 or a corresponding die of the third and fourth die sets 180 and 190 is located in the sealing region 210, the first power controller 236 may be configured by the manufacturer to generate an error signal. In a similar manner, when neither of the second or the fourth die 164 or 174 or a corresponding die of the third and fourth dies sets 180 and 190 is located in the sealing region 210, the second power controller 246 may generate an error signal. As noted above, the processor 282 knows when none of the dies are located in the sealing region 210. In step 403, the processor 282 may generate a pause command to the first power controller 236, i.e., a corresponding signal message generated by the processor 282 may be sent to the first power controller 236 via an Ethernet connection or a hard wire connection, when neither of the first or third dies 162 or 172 or a corresponding die of the third and fourth die sets 180 and 190 is located in the sealing region 210, e.g., the pause command may be generated just before or just as a die is leaving the sealing region 210, thereby avoiding the first power controller 236 from generating an error signal. The processor 282, in step 403, may generates a pause command to the second power controller 246 when neither of the second or fourth dies 164 or 174 or a corresponding die of the third or fourth die sets 180 and 190 is in the sealing region 210, thereby avoiding the second power controller 246 from generating an error signal. In step 405, the processor 282 may generate an active command (to replace the pause command) to the first power controller 236, i.e., a corresponding signal message generated by the processor 282 may be sent to the first power controller 236 via an Ethernet connection or a hard wire connection, when one of the first or the third die 162 or 172 or a corresponding die of the third or fourth die sets 180 and 190 has just entered the sealing region 210, thereby allowing the first power supply 230 to provide power to the one die. The processor 282, in step 407, may generates an active command (to replace the pause command) to the second power controller 246 when one of the second or fourth dies 164 or 174 or a corresponding die of the third or fourth die sets 180 and 190 has just entered the sealing region 210, thereby allowing the second power supply 240 to provide power to the one die.

An exit conveyor 300 is provided downstream from the die section 140 for conveying the formed packages 10 away from the die section 140.

As detailed above, in a first aspect of the disclosure the first die set may comprise movable first and second dies capable of engaging polymeric film layers and, alternative to or in combination with the first die set, a second die set may comprise movable third and fourth dies capable of engaging the polymeric film layers. Also as detailed above, in a second aspect of the disclosure a power supply system may be configured to separately monitor the temperature of the first and second heating conductors when the first die set is engaging the substrate layers and/or separately monitor the temperature of each of the third and fourth heating conductors when the second die set is engaging the substrate layers. Still further, as detailed above, in a third aspect of the disclosure a power supply system may be configured to separately supply power to the first and second dies when the first die set is engaging the substrate layers based on the separately monitored temperatures of the first and second heating conductors and/or the power supply system may be configured to separately supply power to the third and fourth dies when the second die set is engaging the substrate layers based on the separately monitored temperatures of the third and fourth heating conductors. While at least two or all three of the first, second, and third aspects may be combined, it should be understood that the first, second, or third aspect alone is inventive.

Aspect Example Sets of the Disclosure

The following aspects are provided as examples in accordance with the disclosure herein and are not intended to limit the scope of the disclosure:

Aspect Set 1

1. A system for heat sealing substrate layers comprising:
    first and second dies capable of creating a heat seal between the substrate layers, the first die having a first heating conductor and the second die having a second heating conductor, the first and second dies defining a first die set; and
    a power supply system configured to separately monitor the temperature of each of the first and second heating conductors when the first die set is engaging the substrate layers.
2. The system of claim 1, further comprising:
    third and fourth dies capable of creating a heat seal between the substrate layers, the third die having a third heating conductor and the fourth die having a fourth heating conductor, the third and fourth dies defining a second die set; and
    a power supply system configured to separately monitor the temperature of each of the first and second heating conductors when the first die set is engaging the substrate layers and separately monitor the temperature of each of the third and fourth heating conductors when the second die set is engaging the substrate layers.
3. The system of claim 1, further comprising: a conveyor system coupled to the first and second dies and adapted to convey the dies to and from a sealing region.
4. The system of claim 2, further comprising: a conveyor system coupled to the third and fourth dies and adapted to convey the dies to and from a sealing region.
5. The system of claim 2, wherein the conveyor system is coupled to the first, second, third and fourth dies and adapted to convey the dies to and from a sealing region.
6. The system of claim 1, further comprising:
    a power supply system configured to separately supply power to the first and second dies when the first die set is engaging the substrate layers based on the separately monitored temperatures of the first and second heating conductors.
7. The system of claim 2, further comprising:
    a power supply system configured to separately supply power to the first and second dies when the first die set is engaging the substrate layers based on the separately monitored temperatures of the first and second heating conductors and separately supplying power to the third and fourth dies when the second die set is engaging the substrate layers based on the separately monitored temperatures of the third and fourth heating conductors.
8. The system of claim 6, wherein the power supply system monitors the temperature of each of the first and second heating conductors by monitoring the resistance of each of the first and second heating conductors, wherein the resistance of the heating conductors varies proportionally with temperature.
9. The system of claim 7, wherein the power supply system monitors the temperature of each of the first, second, third and fourth heating conductors by monitoring the resistance of each of the first, second, third and fourth heating conductors, wherein the resistance of the heating conductors varies proportionally with temperature.
10. The system of claim 9, wherein the power supply system comprises:
    a first power supply adapted to monitor the resistance of the first heating conductor when the first die is located in the sealing region and monitor the resistance of the third heating conductor when the third die is located in the sealing region, the first power supply provides a variable voltage to the first heating conductor when the first die is located in the sealing region to maintain the resistance of the first heating conductor at a first target resistance value corresponding to a first target temperature and provides a variable voltage to the third heating conductor when the third die is located in the sealing region to maintain the resistance of the third heating conductor at a third target resistance value corresponding to a third target temperature; and
    a second power supply adapted to monitor the resistance of the second heating conductor when the second die is located in the sealing region and monitor the resistance of the fourth heating conductor when the fourth die is located in the sealing region, the second power supply provides a variable voltage to the second heating conductor when the second die is located in the sealing region to maintain the resistance of the second heating conductor at a second target resistance value corresponding to a second target temperature and provides a variable voltage to the fourth heating conductor when the fourth die is located in the sealing region to maintain the resistance of the fourth die at a fourth target resistance value corresponding to a fourth target temperature.
11. The system of claim 10, wherein the power supply system further comprises:
    a controller including a processor and memory for storing code executable by the processor, the processor when executing the executable instructions:
        causes the first power supply to separately determine the resistance of each of the first and third heating conductors at room temperature;
        causes the second power supply to separately determine the resistance of each of the second and fourth heating conductors at room temperature;
        causes the first power supply to determine the first target resistance value based on the resistance of the first heating conductor at room temperature and a temperature coefficient for a material of the first heating conductor;
        causes the first power supply to determine the third target resistance value based on the resistance of the third heating conductor at room temperature and a temperature coefficient for a material of the third heating conductor;
        causes the second power supply to determine the second target resistance value based on the resistance of the second heating conductor at room temperature and a temperature coefficient for a material of the second heating conductor; and
        causes the second power supply to determine the fourth target resistance value based on the resistance of the fourth heating conductor at room temperature and a temperature coefficient for a material of the fourth heating conductor.
12. The system of claim 11, wherein the temperature coefficient for the material of the first and second heating conductors is the same coefficient.

13. The system of claim 11, wherein the temperature coefficient for the material of the first, second, third and fourth heating conductors is the same coefficient.

14. The system of claim 11, wherein the processor when executing the executable instructions further:

generates a pause command to the first power supply when neither of the first or third dies is located in the sealing region; and generates a pause command to the second power supply when neither of the second or fourth dies is in the sealing region.

15. The system of claim 3, wherein the conveyor system comprises:

at least one upper endless belt coupled to the first die and configured to move the first die along a first endless path;

at least one lower endless belt coupled to the second die and configured to move the second die along a second endless path, wherein the upper and lower belts cause the first and second dies to come together at the sealing region and separate after they leave the sealing region.

16. The system of claim 2, wherein the power supply system comprises:

a first power supply;

a second power supply;

a fixed bus bar comprising first, second, third and fourth conductors, the first and second conductors being coupled to the first power supply and the third and fourth conductors being coupled to the second power supply; and first, second, third, fourth, fifth, sixth, seventh and eighth brush blocks, wherein the first and second brush blocks are coupled to and move with the first die, the third and fourth brush blocks are coupled to and move with the second die, the fifth and sixth brush blocks are coupled to and move with the third die, and the seventh and eighth brush blocks are coupled to and move with the fourth die, wherein the first and second brush blocks only make contact with the first and second conductors as the first die moves along a portion of the first endless path, the third and fourth brush blocks only make contact with the third and fourth conductors as the second die moves along a portion of the second endless path, the fifth and sixth brush blocks only make contact with the first and second conductors as the third die moves along a portion of a third endless path, and the seventh and eighth brush blocks only make contact with the third and fourth conductors as the fourth die moves along a portion of a fourth endless path.

17. The system of claim 16, wherein the first power supply comprises:

a first current sensor;

a first isolation transformer coupled to the first and second conductors of the fixed bus bar;

a first relay coupled to the first transformer; and a first power controller coupled to the first relay and configured to control the actuation of the first relay to control an ON/OFF timing of the first transformer to create a variable voltage for the first and third heating conductors when the first and third heating conductors are in the sealing region so as to maintain the first heating conductor at a first target temperature when the first heating conductor is in the sealing region and to maintain the third heating conductor at a third target temperature when the third heating conductor is in the sealing region.

18. The system of claim 17, wherein the second power supply comprises:

a second current sensor;

a second isolation transformer coupled to the third and fourth conductors of the fixed bus bar;

a second relay coupled to the second transformer;

a second power controller coupled to the second relay and configured to control the actuation of the second relay to control an ON/OFF timing of the second transformer to create a variable voltage for the second and fourth heating conductors when the second and fourth heating conductors are in the sealing region so as to maintain the second heating conductor at a second target temperature when the second heating conductor is in the sealing region and to maintain the fourth heating conductor at a fourth target temperature when the fourth heating conductor is in the sealing region.

Aspect Set 2

1. A system for heat sealing substrate layers comprising:

first and second dies capable of creating a heat seal between the substrate layers, the first die having a first heating conductor and the second die having a second heating conductor, the first and second dies defining a first die set; and a power supply system configured to separately supply power to the first and second dies when the first die set is engaging the substrate layers based on the separately monitored temperatures of the first and second heating conductors.

2. The system of claim 1, further comprising:

third and fourth dies capable of creating a heat seal between the substrate layers, the third die having a third heating conductor and the fourth die having a fourth heating conductor, the third and fourth dies defining a second die set; and the power supply system configured to separately supply power to the third and fourth dies when the second die set is engaging the substrate layers based on the separately monitored temperatures of the third and fourth heating conductors.

3. The system of claim 1, further comprising: a conveyor system coupled to the first and second dies and adapted to convey the dies to and from a sealing region.

4. The system of claim 2, further comprising: a conveyor system coupled to the third and fourth dies and adapted to convey the dies to and from a sealing region.

5. The system of claim 2, further comprising: conveyor system is coupled to the first, second, third and fourth dies and adapted to convey the dies to and from a sealing region.

6. The system of claim 1, further comprising:

a power supply system configured to separately monitor the temperature of each of the first and second heating conductors when the first die set is engaging the substrate layers.

7. The system of claim 2, further comprising:

a power supply system configured to separately monitor the temperature of each of the first and second heating conductors when the first die set is engaging the substrate layers and separately monitor the temperature of each of the third and fourth heating conductors when the second die set is engaging the substrate layers.

8. The system of claim 6, wherein the power supply system monitors the temperature of each of the first and second heating conductors by monitoring the resistance of each of the first and second heating conductors, wherein the resistance of the heating conductors varies proportionally with temperature.

9. The system of claim 7, wherein the power supply system monitors the temperature of each of the first, second, third and fourth heating conductors by monitoring the resistance of each of the first, second, third and fourth heating conductors, wherein the resistance of the heating conductors varies proportionally with temperature.

10. The system of claim 9, wherein the power supply system comprises:

a first power supply adapted to monitor the resistance of the first heating conductor when the first die is located in the sealing region and monitor the resistance of the third heating conductor when the third die is located in the sealing region, the first power supply provides a variable voltage to the first heating conductor when the first die is located in the sealing region to maintain the resistance of the first heating conductor at a first target resistance value corresponding to a first target temperature and provides a variable voltage to the third heating conductor when the third die is located in the sealing region to maintain the resistance of the third heating conductor at a third target resistance value corresponding to a third target temperature; and a second power supply adapted to monitor the resistance of the second heating conductor when the second die is located in the sealing region and monitor the resistance of the fourth heating conductor when the fourth die is located in the sealing region, the second power supply provides a variable voltage to the second heating conductor when the second die is located in the sealing region to maintain the resistance of the second heating conductor at a second target resistance value corresponding to a second target temperature and provides a variable voltage to the fourth heating conductor when the fourth die is located in the sealing region to maintain the resistance of the fourth die at a fourth target resistance value corresponding to a fourth target temperature.

11. The system of claim 10, wherein the power supply system further comprises:

a controller including a processor and memory for storing code executable by the processor, the processor when executing the executable instructions:

causes the first power supply to separately determine the resistance of each of the first and third heating conductors at room temperature;

causes the second power supply to separately determine the resistance of each of the second and fourth heating conductors at room temperature;

causes the first power supply to determine the first target resistance value based on the resistance of the first heating conductor at room temperature and a temperature coefficient for a material of the first heating conductor;

causes the first power supply to determine the third target resistance value based on the resistance of the third heating conductor at room temperature and a temperature coefficient for a material of the third heating conductor;

causes the second power supply to determine the second target resistance value based on the resistance of the second heating conductor at room temperature and a temperature coefficient for a material of the second heating conductor; and causes the second power supply to determine the fourth target resistance value based on the resistance of the fourth heating conductor at room temperature and a temperature coefficient for a material of the fourth heating conductor.

12. The system of claim 11, wherein the temperature coefficient for the material of the first and second heating conductors is the same coefficient.

13. The system of claim 11, wherein the temperature coefficient for the material of the first, second, third and fourth heating conductors is the same coefficient.

14. The system of claim 11, wherein the processor when executing the executable instructions further:

generates a pause command to the first power supply when neither of the first or third dies is located in the sealing region; and generates a pause command to the second power supply when neither of the second or fourth dies is in the sealing region.

15. The system of claim 3, wherein the conveyor system comprises:

at least one upper endless belt coupled to the first die and configured to move the first die along a first endless path;

at least one lower endless belt coupled to the second die and configured to move the second die along a second endless path, wherein the upper and lower belts cause the first and second dies to come together at the sealing region and separate after they leave the sealing region.

16. The system of claim 2, wherein the power supply system comprises:

a first power supply;

a second power supply;

a fixed bus bar comprising first, second, third and fourth conductors, the first and second conductors being coupled to the first power supply and the third and fourth conductors being coupled to the second power supply; and first, second, third, fourth, fifth, sixth, seventh and eighth brush blocks, wherein the first and second brush blocks are coupled to and move with the first die, the third and fourth brush blocks are coupled to and move with the second die, the fifth and sixth brush blocks are coupled to and move with the third die, and the seventh and eighth brush blocks are coupled to and move with the fourth die, wherein the first and second brush blocks only make contact with the first and second conductors as the first die moves along a portion of the first endless path, the third and fourth brush blocks only make contact with the third and fourth conductors as the second die moves along a portion of the second endless path, the fifth and sixth brush blocks only make contact with the first and second conductors as the third die moves along a portion of a third endless path, and the seventh and eighth brush blocks only make contact with the third and fourth conductors as the fourth die moves along a portion of a fourth endless path.

17. The system of claim 16, wherein the first power supply comprises:

a first current sensor;

a first isolation transformer coupled to the first and second conductors of the fixed bus bar;

a first relay coupled to the first transformer; and a first power controller coupled to the first relay and configured to control the actuation of the first relay to control an ON/OFF timing of the first transformer to create a variable voltage for the first and third heating conductors when the first and third heating conductors are in the sealing region so as to maintain the first heating conductor at a first target temperature when the first heating conductor is in the sealing region and to maintain the third heating conductor at a third target temperature when the third heating conductor is in the sealing region.

18. The system of claim 17, wherein the second power supply comprises:
a second current sensor;
a second isolation transformer coupled to the third and fourth conductors of the fixed bus bar;
a second relay coupled to the second transformer;
a second power controller coupled to the second relay and configured to control the actuation of the second relay to control an ON/OFF timing of the second transformer to create a variable voltage for the second and fourth heating conductors when the second and fourth heating conductors are in the sealing region so as to maintain the second heating conductor at a second target temperature when the second heating conductor is in the sealing region and to maintain the fourth heating conductor at a fourth target temperature when the fourth heating conductor is in the sealing region.

Aspect Set 3

1. A system for heat sealing substrate layers, the system comprising:
a sealing region;
upper dies, wherein each upper die includes a heating conductor;
lower dies, wherein:
each lower die corresponds to one of the upper dies to create corresponding die sets; and
each lower die includes a heating conductor;
a conveyor system coupled to the upper dies and the lower dies, wherein the conveyor system is configured to convey the die sets to the sealing region such that only one die set is located in the sealing region at a time; and
a power supply system configured to:
monitor a temperature of the heating conductor of the upper die located in the sealing region;
monitor a temperature of the heating conductor of the lower die located in the sealing region, wherein the monitoring of the temperature of the heating conductor of the lower die is performed independently of the monitoring of the temperature of the heating conductor of the upper die;
supply power to the upper die located in the sealing region based on the temperature of the heating conductor of the upper die; and
supply power to the lower die located in the sealing region based on the temperature of the heating conductor of the lower die, wherein the power is supplied to the lower die independently of the power being supplied to the upper die.

2. The system of claim 1, wherein the power supply system monitors the temperature of the heating conductors of the upper and lower dies located in the sealing region by monitoring the resistance of the heating conductors of the upper and lower dies, wherein the resistance of the heating conductors varies proportionally with temperature.

Aspect Set 4

1. A process for heat sealing substrate layers, the process comprising:
conveying an upper die having a heating conductor and a lower die having a heating conductor to a sealing region, where a substrate is applied to one or more items;
activating a power supply system;
monitoring, via the power supply system, a temperature of the heating conductor of the upper die when in the sealing region;
monitoring, via the power supply system, a temperature of the heating conductor of the lower die when in the sealing region, wherein the monitoring of the temperature of the heating conductor of the upper die is performed independently of the monitoring of the temperature of the heating conductor of the lower die;
supplying power to the upper die when in the sealing region based on the temperature of the heating conductor of the upper die;
supplying power to the lower die when in the sealing region based on the temperature of the heating conductor of the lower die, wherein the power is supplied to the lower die when in the sealing region independently of the power being supplied to the upper die when in the sealing region; and
conveying the upper die and the lower die away from the sealing region.

2. The process of claim 1, wherein monitoring the temperature of the heating conductors of the upper and lower dies comprises monitoring the resistance of the heating conductors of the upper and lower dies, wherein the resistance of the heating conductors varies proportionally with temperature.

Additional Considerations

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for heat sealing substrate layers comprising:
movable first and second dies capable of engaging substrate layers to create a heat seal between the substrate layers, the first die having a first heating conductor and the second die having a second heating conductor, the first and second dies defining a first die set; and
a conveyor system coupled to the first and second dies and adapted to convey the first and second dies to and from a sealing region;
movable third and fourth dies capable of engaging the substrate layers to create a heat seal between the substrate layers, the third die having a third heating conductor and the fourth die having a fourth heating conductor, the third and fourth dies defining a second die set;
the conveyor system coupled to the third and fourth dies and adapted to convey the third and fourth dies to and from the sealing region;

a power supply system configured to separately monitor a temperature of each of the first and second heating conductors when the first die set is engaging the substrate layers and separately monitor a temperature of each of the third and fourth heating conductors when the second die set is engaging the substrate layers;

the power supply system configured to separately supply power to the first and second dies when the first die set is engaging the substrate layers based on the separately monitored temperatures of the first and second heating conductors and separately supplying power to the third and fourth dies when the second die set is engaging the substrate layers based on the separately monitored temperatures of the third and fourth heating conductors;

wherein the power supply system monitors the temperature of each of the first, second, third and fourth heating conductors by monitoring a resistance of each of the first, second, third and fourth heating conductors, wherein the resistance of the heating conductors varies proportionally with temperature;

a first power supply adapted to monitor the resistance of the first heating conductor when the first die is located in the sealing region and monitor the resistance of the third heating conductor when the third die is located in the sealing region, the first power supply provides a variable voltage to the first heating conductor when the first die is located in the sealing region to maintain the resistance of the first heating conductor at a first target resistance value corresponding to a first target temperature and provides a variable voltage to the third heating conductor when the third die is located in the sealing region to maintain the resistance of the third heating conductor at a third target resistance value corresponding to a third target temperature;

a second power supply adapted to monitor the resistance of the second heating conductor when the second die is located in the sealing region and monitor the resistance of the fourth heating conductor when the fourth die is located in the sealing region, the second power supply provides a variable voltage to the second heating conductor when the second die is located in the sealing region to maintain the resistance of the second heating conductor at a second target resistance value corresponding to a second target temperature and provides a variable voltage to the fourth heating conductor when the fourth die is located in the sealing region to maintain the resistance of the fourth die at a fourth target resistance value corresponding to a fourth target temperature;

a controller including a processor and memory for storing code executable by the processor, the processor when executing the executable instructions:
causes the first power supply to separately determine the resistance of each of the first and third heating conductors at room temperature;
causes the second power supply to separately determine the resistance of each of the second and fourth heating conductors at room temperature;
causes the first power supply to determine the first target resistance value based on the resistance of the first heating conductor at room temperature and a temperature coefficient for a material of the first heating conductor;
causes the first power supply to determine the third target resistance value based on the resistance of the third heating conductor at room temperature and a temperature coefficient for a material of the third heating conductor;
causes the second power supply to determine the second target resistance value based on the resistance of the second heating conductor at room temperature and a temperature coefficient for a material of the second heating conductor; and
causes the second power supply to determine the fourth target resistance value based on the resistance of the fourth heating conductor at room temperature and a temperature coefficient for a material of the fourth heating conductor.

2. The system of claim 1, wherein the conveyor system is capable of separately conveying the first, second, third and fourth dies to and from the sealing region.

3. The system of claim 1, further comprising:
a power supply system configured to separately monitor the temperature of each of the first and second heating conductors when the first die set is engaging the substrate layers.

4. The system of claim 1, further comprising:
the power supply system configured to separately supply power to the first and second dies when the first die set is engaging the substrate layers based on the separately monitored temperatures of the first and second heating conductors.

5. The system of claim 4, wherein the power supply system monitors the temperature of each of the first and second heating conductors by monitoring the resistance of each of the first and second heating conductors, wherein the resistance of the heating conductors varies proportionally with temperature.

6. The system of claim 1, wherein the temperature coefficient for the material of the first and second heating conductors is the same coefficient.

7. The system of claim 1, wherein the temperature coefficient for the material of the first, second, third and fourth heating conductors is the same coefficient.

8. The system of claim 1, wherein the processor when executing the executable instructions further:
generates a pause command to the first power supply when neither of the first or third dies is located in the sealing region; and
generates a pause command to the second power supply when neither of the second or fourth dies is in the sealing region.

9. The system of claim 1, wherein the conveyor system comprises:
at least one upper endless belt coupled to the first die and configured to move the first die along a first endless path;
at least one lower endless belt coupled to the second die and configured to move the second die along a second endless path,
wherein the upper and lower belts cause the first and second dies to come together at the sealing region and separate after they leave the sealing region.

10. The system of claim 1, wherein the power supply system comprises:
a fixed bus bar comprising first, second, third and fourth bus bar conductors, the first and second bus bar conductors being coupled to the first power supply and the third and fourth bus bar conductors being coupled to the second power supply; and
first, second, third, fourth, fifth, sixth, seventh and eighth brush blocks, wherein the first and second brush blocks are coupled to and move with the first die, the third and fourth brush blocks are coupled to and move with the second die, the fifth and sixth brush blocks are coupled to and move with the third die, and the seventh and eighth brush blocks are coupled to and move with the fourth die,
wherein the first and second brush blocks only make contact with the first and second bus bar conductors as the first die moves along a portion of a first endless path, the third and fourth brush blocks only make contact with the third and fourth bus bar conductors as the second die moves along a portion of a second endless path, the fifth and sixth brush blocks only make contact with the first and second bus bar conductors as the third die moves along a portion of a third endless path, and the seventh and eighth brush blocks only make contact with the third and fourth bus bar conductors as the fourth die moves along a portion of a fourth endless path.

11. The system of claim 10, wherein the first power supply comprises:
a first current sensor;
a first isolation transformer coupled to the first and second bus bar conductors of the fixed bus bar;
a first relay coupled to the first transformer; and
a first power controller coupled to the first relay and configured to control an actuation of the first relay to control an ON/OFF timing of the first transformer to create a variable voltage for the first and third heating conductors when the first and third heating conductors are in the sealing region so as to maintain the first heating conductor at the first target temperature when the first heating conductor is in the sealing region and to maintain the third heating conductor at the third target temperature when the third heating conductor is in the sealing region.

12. The system of claim 11, wherein the second power supply comprises:
a second current sensor;
a second isolation transformer coupled to the third and fourth bus bar conductors of the fixed bus bar;
a second relay coupled to the second transformer;
a second power controller coupled to the second relay and configured to control an actuation of the second relay to control an ON/OFF timing of the second transformer to create a variable voltage for the second and fourth heating conductors when the second and fourth heating conductors are in the sealing region so as to maintain the second heating conductor at the second target temperature when the second heating conductor is in the sealing region and to maintain the fourth heating conductor at the fourth target temperature when the fourth heating conductor is in the sealing region.

13. A system for heat sealing substrate layers comprising:
movable first and second dies capable of engaging substrate layers to create a heat seal between the substrate layers, the first die having a first heating conductor and the second die having a second heating conductor, the first and second dies defining a first die set;
a conveyor system coupled to the first and second dies and adapted to convey the first and second dies to and from a sealing region;
movable third and fourth dies capable of engaging the substrate layers to create a heat seal between the substrate layers, the third die having a third heating conductor and the fourth die having a fourth heating conductor, the third and fourth dies defining a second die set;
the conveyor system coupled to the third and fourth dies and adapted to convey the third and fourth dies to and from the sealing region;
a power supply system configured to separately monitor a temperature of each of the first and second heating conductors when the first die set is engaging the substrate layers and separately monitor a temperature of each of the third and fourth heating conductors when the second die set is engaging the substrate layers;
a first power supply;
a second power supply;
a fixed bus bar comprising first, second, third and fourth bus bar conductors, the first and second bus bar conductors being coupled to the first power supply and the third and fourth bus bar conductors being coupled to the second power supply; and
first, second, third, fourth, fifth, sixth, seventh and eighth brush blocks, wherein the first and second brush blocks are coupled to and move with the first die, the third and fourth brush blocks are coupled to and move with the second die, the fifth and sixth brush blocks are coupled to and move with the third die, and the seventh and eighth brush blocks are coupled to and move with the fourth die; and
wherein the first and second brush blocks only make contact with the first and second bus bar conductors as the first die moves along a portion of a first endless path, the third and fourth brush blocks only make contact with the third and fourth bus bar conductors as the second die moves along a portion of a second endless path, the fifth and sixth brush blocks only make contact with the first and second bus bar conductors as the third die moves along a portion of a third endless path, and the seventh and eighth brush blocks only make contact with the third and fourth bus bar conductors as the fourth die moves along a portion of a fourth endless path.

14. The system of claim 13, wherein the conveyor system is capable of separately conveying the first, second, third and fourth dies to and from the sealing region.

15. The system of claim 13, further comprising:
the power supply system configured to separately monitor the temperature of each of the first and second heating conductors when the first die set is engaging the substrate layers.

16. The system of claim 15, further comprising:
the power supply system configured to separately supply power to the first and second dies when the first die set is engaging the substrate layers based on the separately monitored temperatures of the first and second heating conductors.

17. The system of claim 13, further comprising:
the power supply system configured to separately supply power to the first and second dies when the first die set is engaging the substrate layers based on the separately monitored temperatures of the first and second heating conductors and separately supplying power to the third and fourth dies when the second die set is engaging the substrate layers based on the separately monitored temperatures of the third and fourth heating conductors.

18. The system of claim 16, wherein the power supply system monitors the temperature of each of the first and second heating conductors by monitoring a resistance of each of the first and second heating conductors, wherein the resistance of the heating conductors varies proportionally with temperature.

19. The system of claim 17, wherein the power supply system monitors the temperature of each of the first, second, third and fourth heating conductors by monitoring a resistance of each of the first, second, third and fourth heating conductors, wherein the resistance of the heating conductors varies proportionally with temperature.

20. The system of claim 19, wherein the power supply system comprises:
a first power supply adapted to monitor the resistance of the first heating conductor when the first die is located in the sealing region and monitor the resistance of the third heating conductor when the third die is located in the sealing region, the first power supply provides a variable voltage to the first heating conductor when the first die is located in the sealing region to maintain the resistance of the first heating conductor at a first target resistance value corresponding to a first target temperature and provides a variable voltage to the third heating conductor when the third die is located in the sealing region to maintain the resistance of the third heating conductor at a third target resistance value corresponding to a third target temperature; and
a second power supply adapted to monitor the resistance of the second heating conductor when the second die is located in the sealing region and monitor the resistance of the fourth heating conductor when the fourth die is located in the sealing region, the second power supply provides a variable voltage to the second heating conductor when the second die is located in the sealing region to maintain the resistance of the second heating conductor at a second target resistance value corresponding to a second target temperature and provides a variable voltage to the fourth heating conductor when the fourth die is located in the sealing region to maintain the resistance of the fourth die at a fourth target resistance value corresponding to a fourth target temperature.

21. The system of claim 20, wherein the power supply system further comprises:
a controller including a processor and memory for storing code executable by the processor, the processor when executing the executable instructions:
causes the first power supply to separately determine the resistance of each of the first and third heating conductors at room temperature;
causes the second power supply to separately determine the resistance of each of the second and fourth heating conductors at room temperature;
causes the first power supply to determine the first target resistance value based on the resistance of the first heating conductor at room temperature and a temperature coefficient for a material of the first heating conductor;
causes the first power supply to determine the third target resistance value based on the resistance of the third heating conductor at room temperature and a temperature coefficient for a material of the third heating conductor;
causes the second power supply to determine the second target resistance value based on the resistance of the second heating conductor at room temperature and a temperature coefficient for a material of the second heating conductor; and causes the second power supply to determine the fourth target resistance value based on the resistance of the fourth heating conductor at room temperature and a temperature coefficient for a material of the fourth heating conductor.

22. The system of claim 21, wherein the temperature coefficient for the material of the first and second heating conductors is the same coefficient.

23. The system of claim 21, wherein the temperature coefficient for the material of the first, second, third and fourth heating conductors is the same coefficient.

24. The system of claim 21, wherein the processor when executing the executable instructions further:
generates a pause command to the first power supply when neither of the first or third dies is located in the sealing region; and
generates a pause command to the second power supply when neither of the second or fourth dies is in the sealing region.

25. The system of claim 13, wherein the conveyor system comprises:
at least one upper endless belt coupled to the first die and configured to move the first die along the first endless path;
at least one lower endless belt coupled to the second die and configured to move the second die along the second endless path,
wherein the upper and lower belts cause the first and second dies to come together at the sealing region and separate after they leave the sealing region.

26. The system of claim 13, wherein the first power supply comprises:
a first current sensor;
a first isolation transformer coupled to the first and second bus bar conductors of the fixed bus bar;
a first relay coupled to the first transformer; and
a first power controller coupled to the first relay and configured to control an actuation of the first relay to control an ON/OFF timing of the first transformer to create a variable voltage for the first and third heating conductors when the first and third heating conductors are in the sealing region so as to maintain the first heating conductor at a first target temperature when the first heating conductor is in the sealing region and to maintain the third heating conductor at a third target temperature when the third heating conductor is in the sealing region.

27. The system of claim 26, wherein the second power supply comprises:
a second current sensor;
a second isolation transformer coupled to the third and fourth bus bar conductors of the fixed bus bar;
a second relay coupled to the second transformer;
a second power controller coupled to the second relay and configured to control an actuation of the second relay to control an ON/OFF timing of the second transformer to create a variable voltage for the second and fourth heating conductors when the second and fourth heating conductors are in the sealing region so as to maintain the second heating conductor at a second target temperature when the second heating conductor is in the sealing region and to maintain the fourth heating conductor at a fourth target temperature when the fourth heating conductor is in the sealing region.

* * * * *